Oct. 14, 1952  H. W. RUSS ET AL  2,613,705
MACHINE FOR FORMING THE UPPER FACES OF WEDGE WHEELS
Filed Sept. 22, 1951  7 Sheets-Sheet 3
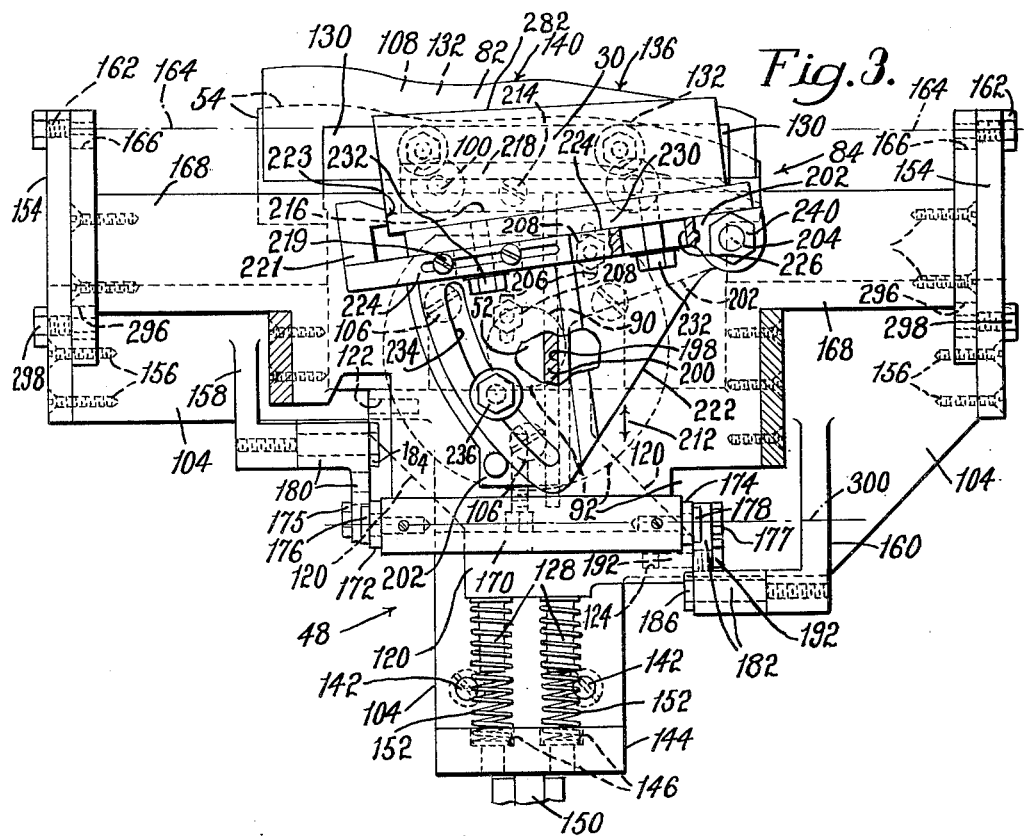
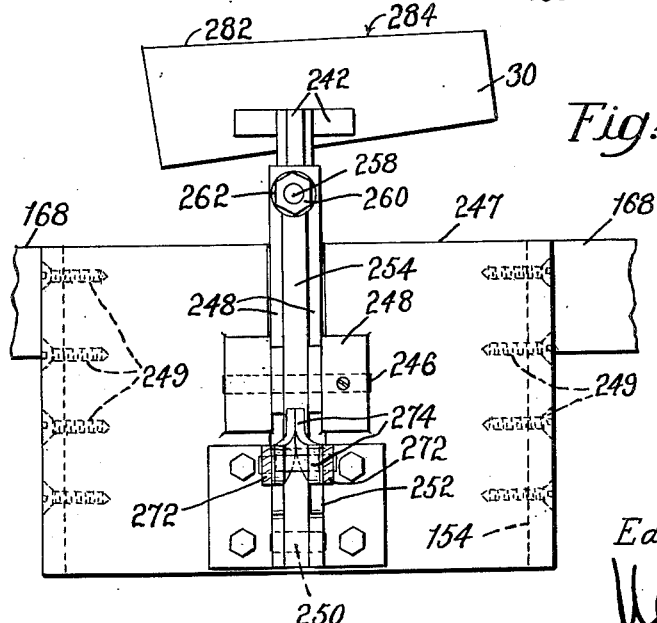
Inventors
Harley W. Russ
Edgar E. Joiner Jr.
By their Attorney Oct. 14, 1952     H. W. RUSS ET AL     2,613,705
MACHINE FOR FORMING THE UPPER FACES OF WEDGE WHEELS
Filed Sept. 22, 1951     7 Sheets-Sheet 4
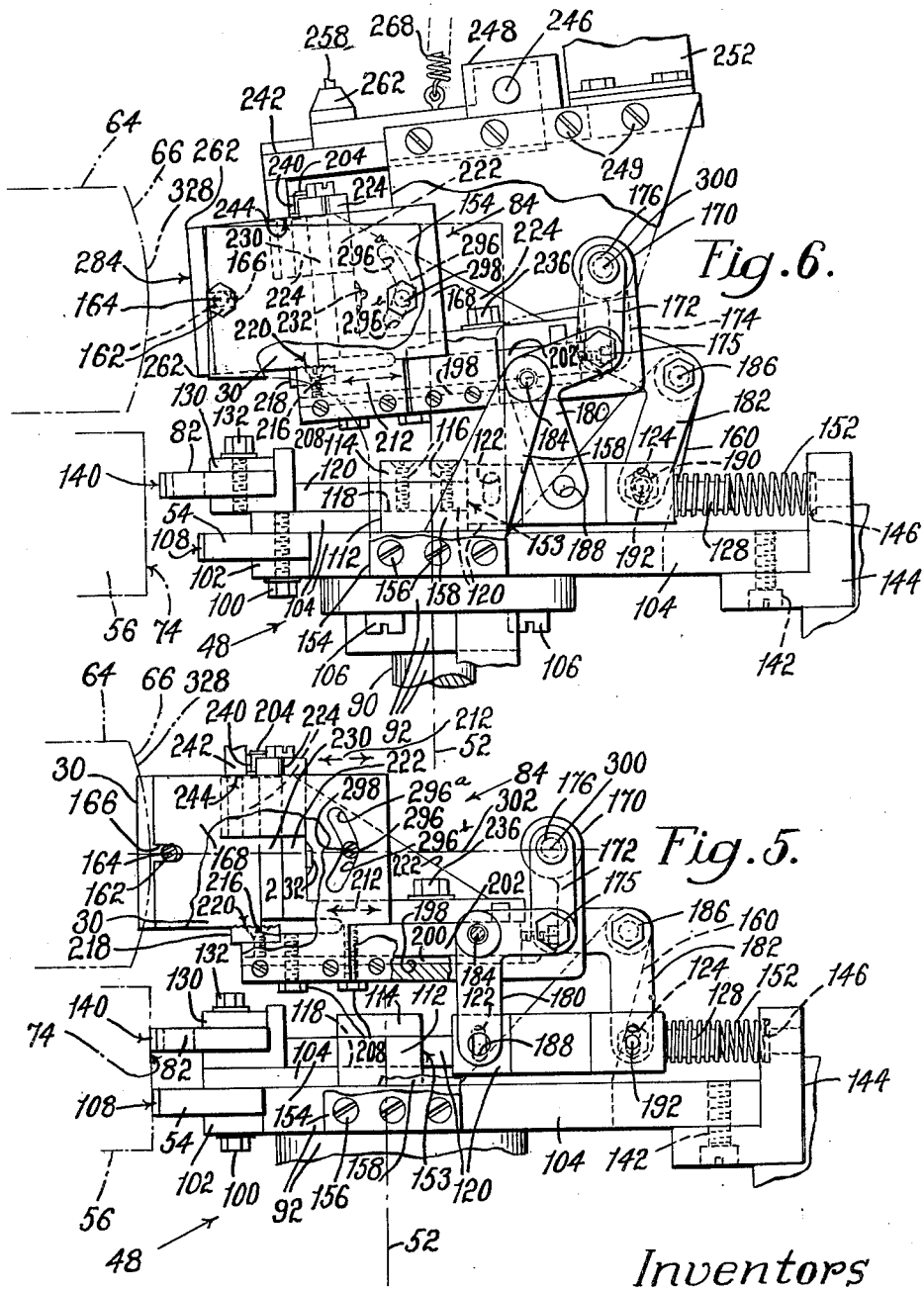
*Inventors*
Harley W. Russ
Edgar E. Joiner Jr.
By their Attorney

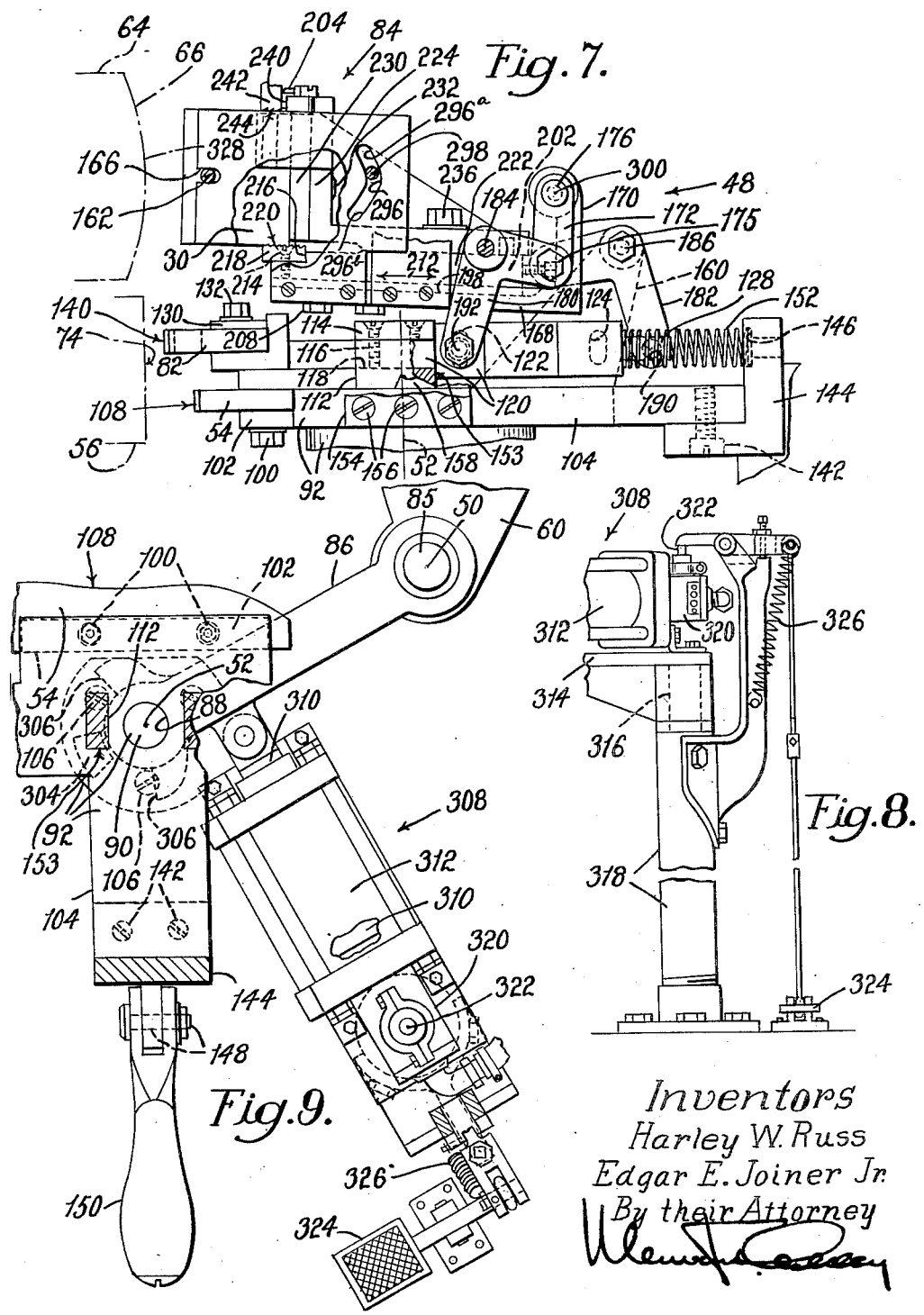

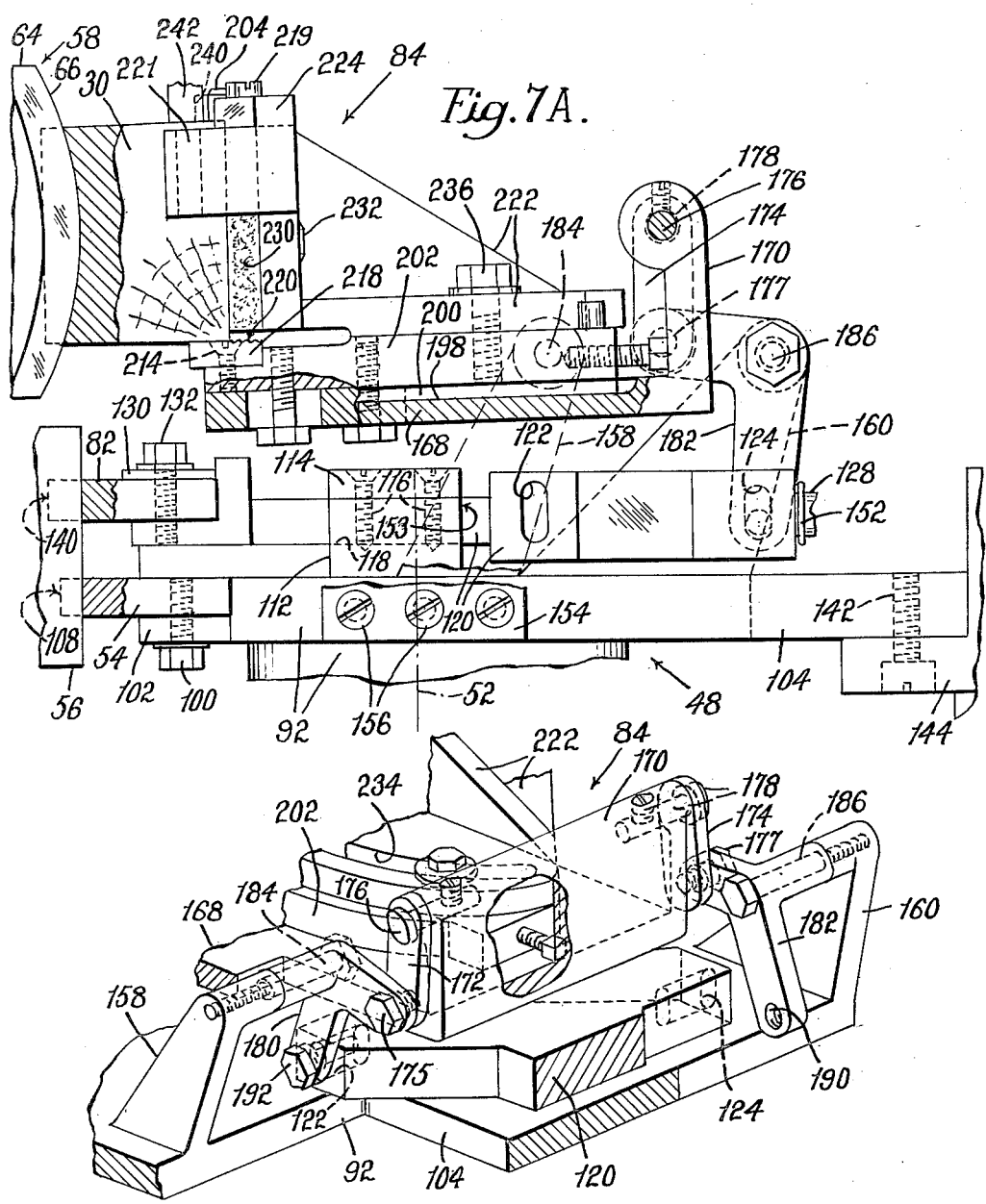

Oct. 14, 1952     H. W. RUSS ET AL     2,613,705
MACHINE FOR FORMING THE UPPER FACES OF WEDGE WHEELS
Filed Sept. 22, 1951     7 Sheets-Sheet 7
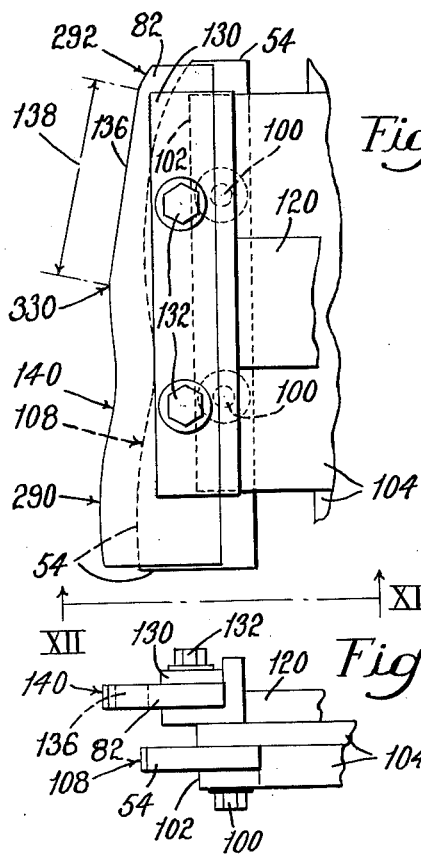
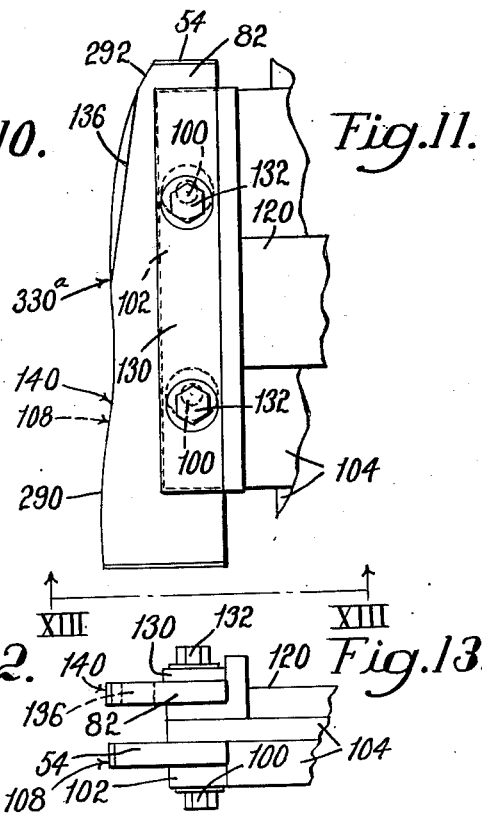
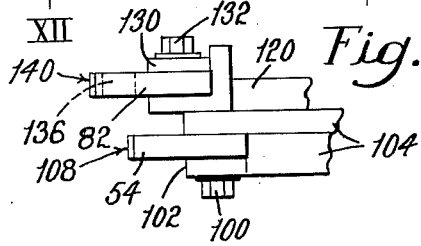
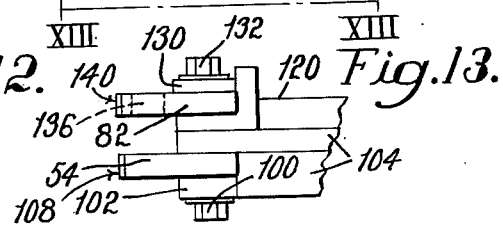
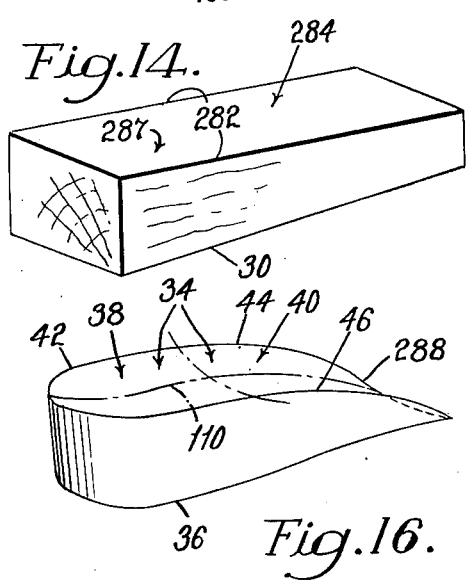
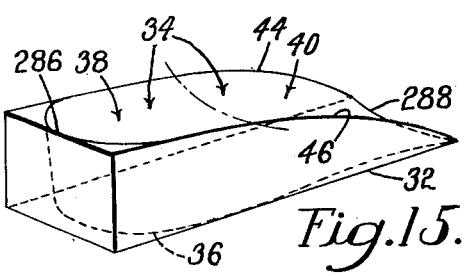
Inventors
Harley W. Russ
Edgar E. Joiner Jr.
By their Attorney Patented Oct. 14, 1952

2,613,705

UNITED STATES PATENT OFFICE 2,613,705

MACHINE FOR FORMING THE UPPER FACES OF WEDGE HEELS

Harley W. Russ, Haverhill, and Edgar E. Joiner, Jr., Andover, Mass., assignors to United Shoe Machinery Corporation, Flemington, N. J., a corporation of New Jersey Application September 22, 1951, Serial No. 247,782

20 Claims. (Cl. 144—145)

1

This invention relates to wood heel making machinery, it being an object of the invention to provide an inexpensive machine by the use of which the upper or combined heel seat and shank faces of wedge heels may be quickly and effectively formed to fit opposing portions of the bottoms of shoes to which they are to be attached.

The present invention consists in the novel features hereinafter described, reference being had to the accompanying drawings illustrating one embodiment of the invention which is fully disclosed in the following description and claims.

In the drawings,

Fig. 3 is a view on line III—III of Fig. 1 showing heel blank supporting and positioning mechanism;

Fig. 4 is a view on line IV—IV of Fig. 1 showing portions of heel blank clamping mechanism;

Fig. 4A is a view showing in perspective a portion of a lock forming part of heel blank clamping mechanism;

Fig. 5 shows in side elevation, partly broken away, the machine adjusted to form a right wedge heel block, a heel blank carrier of the machine being in a neutral position during the forming of the heel seat portion of the block from a wedge heel blank;

Figs. 6 and 7 show in side elevation, partly broken away, the heel blank carrier of the machine in its idle position ready to operate upon heel blanks to form, respectively, right and left wedge heel blocks;

Figs. 7A is a side elevation, partly in section and partly broken away, showing the heel blank carrier in the process of forming the upper face of the shank portion of the right wedge heel block;

Fig. 7B shows in perspective a portion of the heel blank carrier illustrated in Fig. 7;

Fig. 8 is a side view, partly broken away, of fluid-pressure actuated means for forcing a work supporting jack of the machine against a rub collar of the machine;

Fig. 9 is a section on line IX—IX of Fig. 1;

Fig. 10 is a plan view showing patterns of a jack of the machine when the machine is idle;

Fig. 11 is a view similar to Fig. 10 but showing the positions of patterns when the heel seat portions of wedge heel blocks are being formed from the heel blanks;

Figs. 12 and 13 are views on lines XII—XII and XIII—XIII of Figs. 10 and 11, respectively;

Fig. 14 shows in perspective a wedge heel blank;

Fig. 15 shows the blank illustrated in Fig. 14 after it has been operated upon by the illustrative machine; and

2

Figure 1:
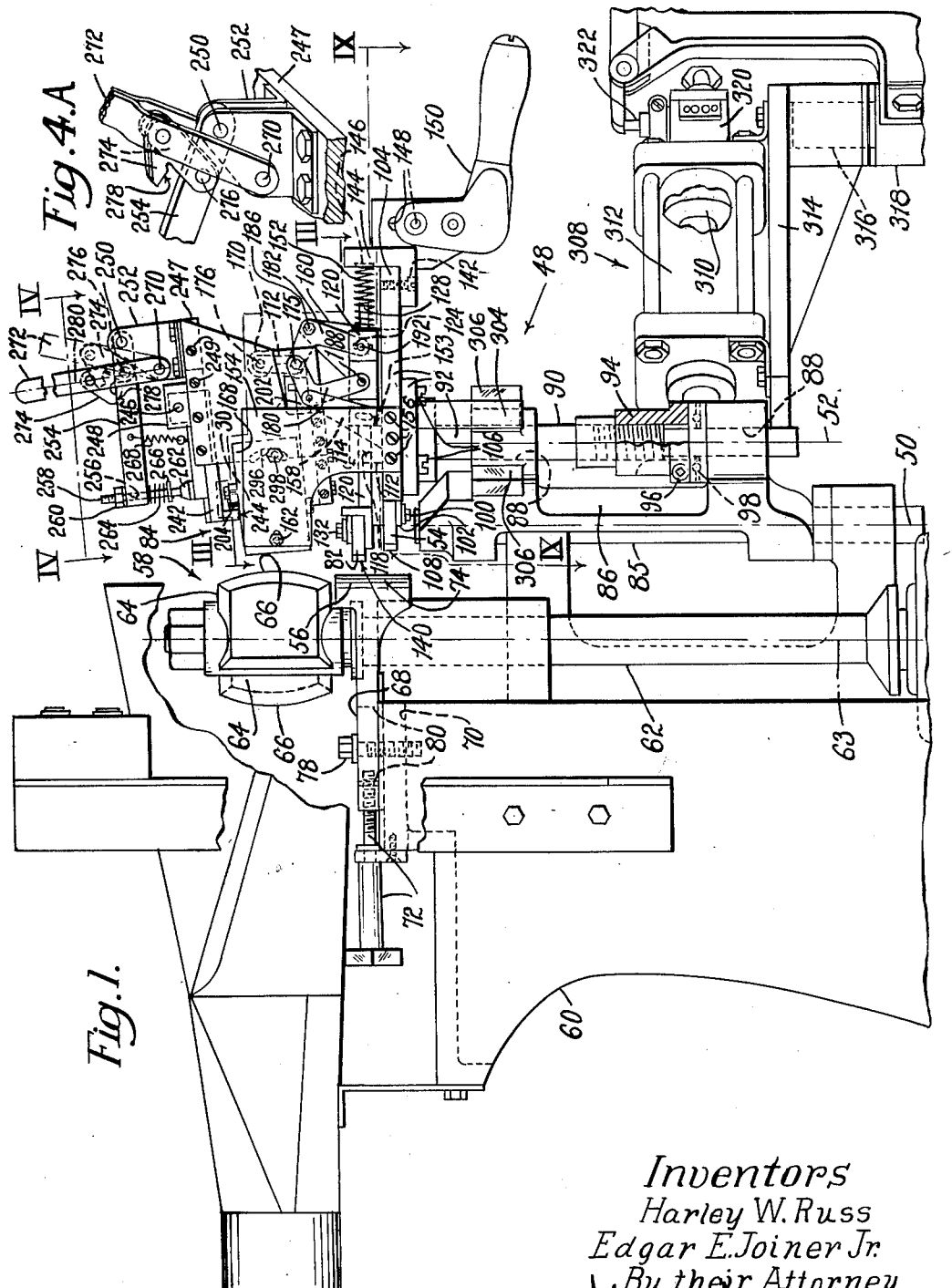
Figs. 1 and 2 are side and plan views respectively, partly broken away, of the illustrative machine.

Fig. 16 shows a wedge heel which has been formed by turning the wood heel block illustrated in Fig. 15.

The illustrative machine is described with reference to trimming the upper faces of wedge heel blanks 30 to form wedge heel blocks 32 (Fig. 15) the upper faces 34 of which, after the side and rear faces of the blocks have been turned to produce wedge heels 36 (Fig. 16), are complemental to the bottoms of shoes (not shown) to which said heels are subsequently attached. The trimming operation performed by the use of the illustrative machine includes what is commonly referred to as the concaving operation by which there is provided a cup or cup portion 38 (Figs. 15 and 16) of the wedge heel block 32 and accordingly the heel 36 and a shank portion 40 of the upper face of the wedge heel block or heel. The rim 42 of the cup 38 of the wedge heel 36 commonly lies in a plane and the inside rim 44 of the shank portion 40 of the face 34 is desirably higher than the outside rim 46 of the shank portion of said face, the entire rim of the upper face 34 of the wedge heel 36 being substantially complemental to opposed portions of the shoe to which the heel is to be attached.

Figure 2:
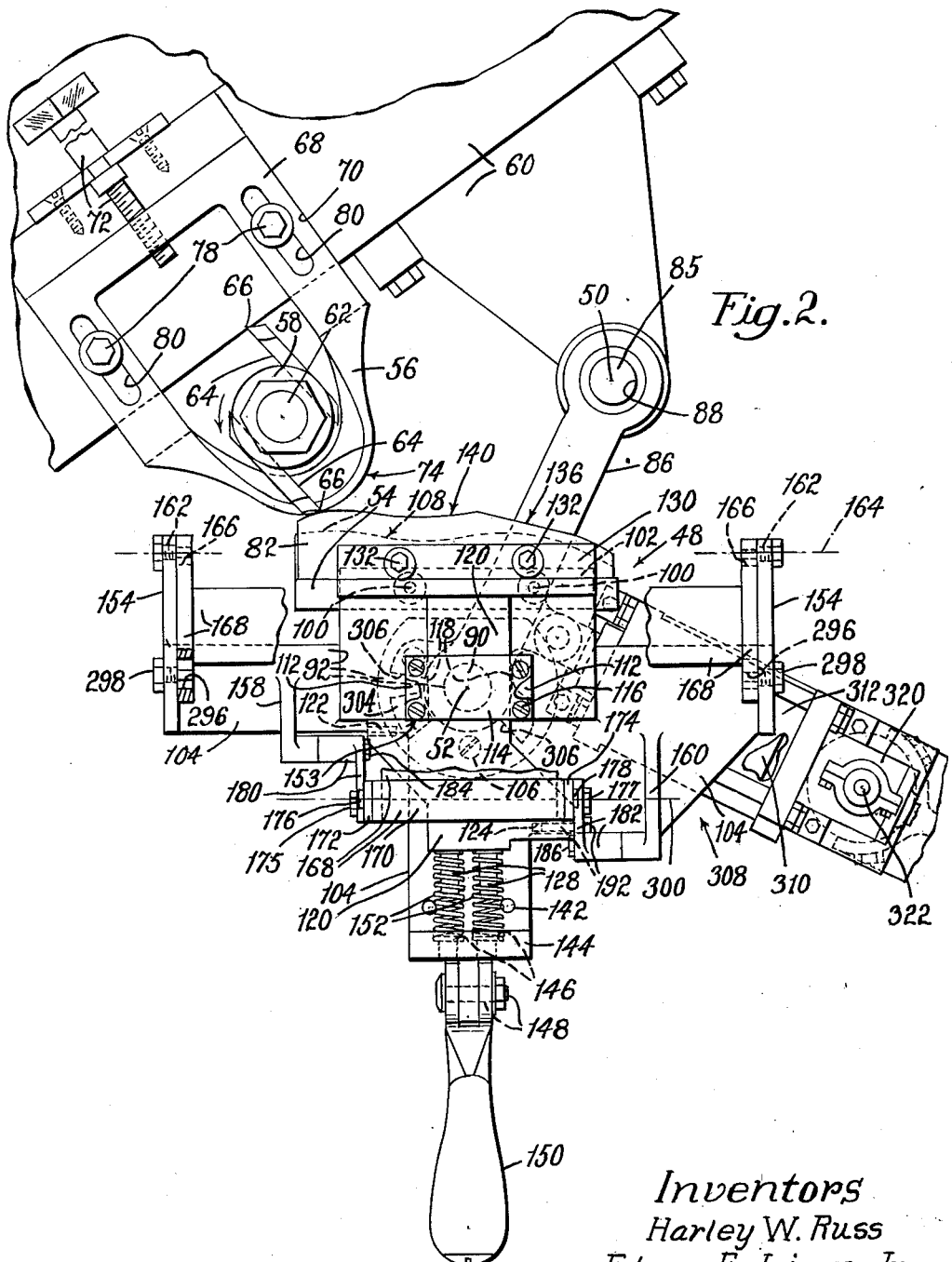

The machine hereinafter disclosed is similar in many respects to machines (not shown) for use in "turning" the wedge heel blocks 32 to form the side and rear surfaces of the wedge heel 36, the heel blank 30 being mounted on a jack 48 which is pivoted for simultaneous movement about two parallel spaced axes 50, 52 (Figs. 1, 2 and 9) and has secured to it a guide pattern 54 which is held in engagement with an abutment or rub collar 56 (Figs. 1, 2, 5, 6, 7 and 7A) as the heel blank is moved manually about said spaced axes past a rotary tool or cutter 58.

The machine comprises a main frame 60 (Figs. 1, 2 and 9) in bearings of which is rotatably mounted a vertical spindle 62 which is rotatable about an axis 63 (Fig. 1) and has secured to its upper end the cutter 58. The illustrative cutter 58 comprises a pair of blades 64 having convex cutting edges 66 the lengthwise curvatures of which are substantially similar to the transverse curvatures of the heel seat and shank portions of shoes to which the heels being operated upon are to be attached.

Positioned just below the cutter 58 is the rub collar 56, said collar, as will be hereinafter explained, cooperating with the jack 48 to guide the wedge heel blank 30 past the cutter 58. The rub collar 56 has a shank 68 (Figs. 1 and 2) which fits slidingly in a guideway 70 of the main frame 60 and the rear end of which has threaded into it a threaded adjusting rod 72 rotatably mounted in said frame. After the rub collar 56 has been initially adjusted in its guideway 70 to a position in which a cylindrical rub face 74 of the collar lies approximately beneath the locus of the central portion of the cutting edges 66, the operator tightens a bolt 78 which is threaded into the frame 60 and extends through an elongated slot 80 in the shank of the collar and normally has its head overlying and in clamped relation with said shank.

As above explained, the upper or attaching face 34 of the wedge heel block 32 and the wedge heel 36 comprises the cup and shank portions 38, 40 of said face, said shank portion being somewhat higher at its inner edge 44 than at an opposite portion of its outer edge 46. The shapes of the shank portions of shoes of different styles vary and accordingly it is desirable to vary the shapes of the upper faces 34 of the wedge heels 36 to be attached to shoes. In order independently to vary the heights and the contours of the opposite edges 44, 46 of the shank face 40 of the wedge heel block 32 and accordingly the wedge heel 36, the heel blank 30 is tilted laterally as it is moved longitudinally past the cutter 58, the degree of tilt continually varying in accordance with the shape of an actuating pattern or template 82 which is slidable with relation to the pattern 54 and which, through mechanism hereinafter described, tilts a heel holder 84 of the jack 48. It will be noted that the edges 44, 46 of the wedge heel 36 are slightly lower than, and of a slightly different shape from, the edges 44, 46 of the block 32 from which the heel is turned. In view of the fact that the upper faces 34 as well as the edges 44, 46 of the block 32 and the heel 36 are very similar, the same reference numerals are applied to corresponding parts of the upper face of the block and the heel.

Extending forward from the main frame 60 are a pair of bosses upon which is pivotally mounted a rod 85 (Figs. 1, 2 and 9) having secured to it a supporting arm 86 provided at its outer end with alined bores 88 for receiving a rod 90 forming part of a carrier or supporting unit 92 of the jack 48, said carrier being rotatable simultaneously about the axes 50, 52 of the rods 85, 90, respectively. The rod 90 has threaded onto it a split bushing 94 (Fig. 1) which may be set in different adjusted positions upon the rod by the use of a screw 96, said bushing having its lower end resting upon a thrust bearing 98 supported by the arm 86. Secured by screws 100 and a clamp 102 to a platform 104 which is secured by screws 106 to a boss of the rod 90 and constitutes part of the carrier 92 of the jack 48 is the pattern 54 a cylindrical rub face 108 of which is substantially of the same outline as a longitudinal median line 110 (Fig. 16) of the upper or attaching face 34 of the wedge heel 36.

The platform 104 is provided with a pair of upstanding lugs 112, which form, together with a face of the platform and a removable cover plate 114 secured by screws 116 to said lugs, a guideway 118 in which fits a slide 120. A forward portion of the slide 120 has formed in its opposite sides a pair of elongated slots 122, 124, said slide having secured to its forward end a pair of spring-retaining studs 128. Secured to a wide angular rear end of the slide 120 by a clamp plate 130 and screws 132 is the actuating pattern 82, a cylindrical rub face 140 of which is identical with the face 108 of the pattern 54 except for a slabbed-off edge portion 136 (Fig. 11). The word "cylindrical" defining the rub faces 108, 140 is used in its geometrical sense and defines a curved surface generated by moving a straight line while keeping it constantly parallel to a fixed line. Secured by screws 142 to the forward end of the platform 104 is an angle bar 144 which is provided with spring-retaining recesses 146 and has a handle 150 adjustably secured to it by screw-and-slot connections at 148. Interposed between the spring-retaining recesses 146 and the slide 120 and mounted upon the studs 128 are springs 152 which constantly urge the slide to an idle rearward or projected position shown in Figs. 6 and 7, the rearward limit of said movement being determined by the engagement of the slide with shoulders 153 of the lugs 112 of the platform 104.

As will be explained later, when, during operation upon the blank 30, alined elements of identical portions of the cylindrical faces 108, 140 of the patterns 54, 82 are forced against the rub collar 56, the work holder 84 is in a horizontal or neutral position as shown in Fig. 5, but when the slabbed-off edge portion 136 extending over a distance indicated by 138 of the pattern 82 engages the collar 56 the pattern 82 will be permitted to move to the left or to its projected position, as viewed in Fig. 5, under the action of the springs 152 with relation to the pattern 54 and such movement will effect, through mechanism hereinafter described, a slight upward or downward varying tilt of the work holder 84 as the work traverses the cutter 58 to form in the upper faces of right and left heel blanks the inner rim portions 44 which are higher than the outer rim portions 46. The platform 104 of the jack 48 comprises a pair of spaced upstanding headers 154 which are secured to the platform by screws 156. The platform 104 has also formed integral with it laterally and longitudinally offset upstanding brackets 158, 160 for supporting, as will be explained, mechanism which controls the angular position of the work holder 84 on the jack and which in response to longitudinal movement of the pattern 82, as said pattern traverses the rub collar 56, tilts the blank 30 as the blank moves past the cutter 58.

The headers 154 have threaded into them bearing studs 162 which have a common axis 164 and fit in slots 166 formed in rear portions of a suspended yoke 168. The forward end of the yoke 168 has an upstanding suspension portion 170 to opposite ends of which links 172, 174 are pivotally connected by screws 176, 178. Pivotally connected by pivot pins 175, 177 to the lower ends of the links 172, 174 are bell-crank levers 180, 182, respectively, which are rotatably mounted on bearing pins 184, 186 secured to the upstanding brackets 158, 160, respectively, of the platform 104. The lower ends of the bell-crank levers 180, 182 are provided with bores 188, 190 (Figs. 1, 5 and 6) in which is selectively secured a pin 192 adapted slidingly to fit in the slots 122, 124, respectively, formed in the slide 120. As will be hereinafter explained, the pin 192 is secured in the bore 190 and the slot 124 when right wedge heel blocks 32 are being formed and in the bore 188 and the slot 122 when left wedge heel blocks are being formed.

The yoke 168 upon which the wedge heel block holder 84 is adjustably secured has formed in it a groove 198 in which fits slidingly a depending flange 200 (Figs. 3 and 5) of a heel blank mount 202 (Figs. 3, 5, 6, 7, 7A and 7B). Secured to the mount 202 is an upstanding bearing pin 204 and threaded into a base of the mount are cap bolts 208 which pass through slots 206 in the yoke, said bolts serving to retain the mount in different adjusted positions upon the yoke in directions indicated by arrows 212. Secured by a screw 214 to a rear or rabbeted portion of the yoke 168 is a plate 218 (Figs. 5, 6, 7 and 7A) having a serrated face 220 upon which the lower side of the wood heel blank rests.

Pivoted upon the upstanding bearing pin 204 of the mount 202 is an angular rest 222 having a vertical flange 224 provided with slots 226 (Fig. 3) through which extend cap bolts 232 which are threaded into a fibre backing board 230, said board being held in different adjusted positions against the flange 224 by said bolts. In order initially angularly to adjust the rest 222 in accordance with the wedge angle with the heel blank 30, said angular rest has formed in it an arcuate slot 234 for receiving a cap bolt 236 which is threaded into the mount 202, said bolt serving to secure the rest 222 to the mount 202 in its different angularly adjusted positions about the pin 204. A nut 240 which is threaded upon the pin 204 and normally bears with considerable pressure against the upper surface of the angular rest 222 is backed away from the rest preparatory to adjusting said rest on the mount 202, said nut being again forced against the rest after the proper adjustment has been effected. It is desirable that blanks 30 be readily positioned lengthwise upon the serrated face 220 and against the backing board 230 and, accordingly, there is adjustably secured to the vertical flange 224 of the angular rest 222 through slot-and-screw connections at 219 (Figs. 3 and 7A) an end gage 221 having a face 223 which is engaged by a high end of the wedge heel blank 30.

The wedge heel blank 30 is clamped against the face 220 of the serrated plate 218 and against the backing board 230, after said plate and backing board have been initially fixed in their adjusted positions upon the yoke 168, by a presser arm 242 which has a knurled work-engaging face 244 (Figs. 1, 5, 6 and 7) and is pivoted upon a pin 246 (Figs. 1, 4 and 6) carried by lugs 248 of a plate 247 (Figs. 4 and 4A) extending across and secured by screws 249 to the headers 154. Pivoted upon a pin 250 carried by a bracket 252 secured to the plate 247 is an arm 254 which has at its rear end a vertical bore 256 (Fig. 1) in which a rod 258 is slidingly mounted. Threaded onto the upper end of the rod 258 is a nut 260 and universally connected to the lower end of the rod is a spring-pressed cup 262, the cup being constantly depressed with relation to the arm by a spring 264 (Fig. 1) interposed between the arm and a collar 266 secured to the rod. A spring 268, upper and lower ends of which are attached, respectively, to the arm 254 and to the work presser arm 242, constantly urges the cup 262 against the arm 242.

Also pivotally mounted on a pin 270 (Figs. 1 and 4A) carried by the bracket 252 is an upstanding bifurcated handle 272 having pivoted to it a lock lever 274 which has its lower end pivoted through a pin 276 to the arm 254 and which has a face 278 overlying said arm. When the handle 272 is swung forward to its dash-line position (Fig. 1) it moves the arm 254 to a raised position, shown in detail in Fig. 4A, and raises with it the presser arm 242 so that the blank 30 may be placed without interference upon the serrated plate 218. As the handle 272 is swung from its position shown in Fig. 4A to its full-line position in Fig. 1, the face 278 of the lever 274 engages the upper surface of the arm 254 and forces the work-engaging cup 262 through the action of the spring 264 against the presser arm 242 which in turn presses on the wedge heel blank 30. When the handle 272 is in its clamping position an axis of the pin 276 is arranged just to the right (Fig. 1) of a center line 280 of the handle with the result that the lock lever 274 holds the arm 254 against upward movement until the handle has been manually moved forward.

The axis of the cutter spindle 62 is arranged vertically and the yoke 168 and the remainder of the heel positioning and clamping mechanism above described, which may be collectively referred to as a heel holder, may be said to be arranged in a neutral position, such as shown in Fig. 5, when a portion of the face 140 of the slidable pattern 82 is positioned directly above an identical portion of the face 108 of the pattern 54 and said faces are in engagement with the rub collar 56. The blank 30 is so positioned in the holder 84 that when said holder is in neutral position opposite portions of the longitudinal edges 282 (Figs. 3, 4 and 14) of an upper face 284 of the blank are arranged equal distances from the axis of rotation of the cutter 58, said upper face being parallel to said axis.

When the wedge heel blank 30 thus held in its neutral position traverses the cutter 58, there will not be any movement of the slide 120 during the operation upon the blank so long as the cylindrical faces 108, 140 of the patterns 54, 82 are identical and are positioned in vertical alinement, the resulting inner and outer rim portions 44, 46 of the face 34 being of the same height. As above stated, the contour of the face 108 of the guide pattern 54 is practically identical with that of the central lengthwise line 110 of the face 34 of the wedge heel block 32 on the wedge heel 36.

In operating upon the wedge heel blank 30 a portion of the upper face 284 of the blank, which portion is indicated generally by reference numeral 287 (Fig. 14), is first swung against the cutter thereby forming in the face 284 of the blank a cavity which extends generally from one of the longitudinal edges 282 of said face to the other. In order to form the rear end portion of the cup 38 of the wedge heel block 32 the jack then is swung clockwise, as viewed from above, from its position of initial contact with the cutter, said blank controlled by the pattern 54 moving forwardly of the machine and away from the cutter as it traverses said cutter and leaving said cutter at a point 286 (Fig. 15) located approximately at the rear central end of the wedge heel blank. As will be hereinafter explained, the jack is thereafter swung counterclockwise, as viewed from above, until the wedge heel blank has been carried past the cutter to form a fine edge 288 where the upper and bottom faces of the wedge heel block intersect. In order to impart well controlled smooth motion to the blank as its rear and forward end portions are being operated upon, the patterns 54, 82 have at their rear ends identical "ride up" portions 290 (Figs. 10 and 11) and have identical "drop off" portions 292 at their forward ends. The shapes of the faces of the patterns will be further discussed in connection with the description of the operation of the machine.

In the illustrative wedge block 32 the major portion of the cup 38 of the block extends to the lateral face of the block. In the manufacture of heels it is sometimes the practice for the heel block to have its cup extend almost to the sides and to the rear end of the blank, a narrow flat "land" which is formed around the cup being later removed during the subsequent heel turning operation.

In view of the foregoing it will be clear that when identical vertically-alined portions of the cylindrical faces 108, 140 of the patterns 54, 82 are forced against the rub collar 56 as the work traverses the cutter 58, the resultant opposite longitudinal rims or edges 44, 46 of the block being operated upon will be of identical heightwise contours.

As above explained, the portions of the inside margin of the shank portion of the shoe bottom are usually higher than laterally corresponding portions of the outer margin of the shank portions of the shoe bottom. Accordingly, in order that the wedge heel 36 shall "form fit" the shank portion of the shoe, the inner rim 44 of the shank portion 40 of the upper face 34 of the heel must be higher than the outer rim of said shank portion and of a slightly different contour, as viewed from the side of the wedge heel block 32 or the wedge heel 36. It is, therefore, desirable during the traversing of the right and left heel blanks 30 past the cutter 58 to tilt said blanks counterclockwise and clockwise, respectively, from the neutral position shown in Fig. 5, the wood heel blanks positioned and clamped in the machine being rotated about axes extending substantially lengthwise of the upper and lower lateral edges 282 of the faces 284 of the heel blanks 30. The blanks 30 are not always of uniform width throughout their length and in operating upon such blanks the axes about which the blanks are tilted extend generally lengthwise of the blank and pass approximately through the mean portions of the edges 282, respectively.

With the foregoing considerations in view, the yoke 168, the rear and forward ends of which are suspended, respectively, upon the bearing screws 162 and upon the screws 176, 178, has formed in it pairs of cam slots 296 (Figs. 1, 2, 5, 6 and 7) upper and lower portions 296a, 296b of which are centered substantially about the lower and upper edges 282, respectively, of the wedge heel blank 30 positioned in the holder 84, pins 298 which are secured to the yoke fitting in corresponding slots 296a or 296b in accordance with whether a left or right wedge heel block 32 is to be formed or when the holder is in neutral position, as shown in Fig. 5, fitting in registering ends of both slots 296a, 296b. It will be clear from the foregoing that the holder 84 may be raised or lowered from its neutral position shown in Fig. 5 in operating upon right or left heel blanks 30, respectively, by effecting rearward movement of the slide 120 with relation to the carrier 92, the direction of substantially vertical movement of the suspension portion 170 of the yoke 168 under the action of the above-described mechanism depending upon which of the bell-crank levers 180, 182 operatively connects the slide to the yoke.

When wedge heels 30 are being operated upon to form right heel blocks 32, the pin 192 is operatively connected to the bell-crank lever 182 and fits in the elongated recess 124 of the slide 120 with the result that when the slide 120 under the action of the springs 152 moves rearward upon the carrier 92 the bell-crank lever 182 is moved clockwise from its position shown in Fig. 5, the arcuate slot 296b moving up into engagement with the pins 298 causing the yoke 168, together with its holder 84 and the blank 30 positioned and clamped therein, to swing approximately about the upper edge 282 of the block with the result that the inner rim 44 of the shank portion of the upper face 34 of the right heel block 32 and accordingly the wedge heel 36 is higher than the outside rim 46 of the shank portion of said upper face when the block is moved past the cutter.

The bell-crank levers 180, 182 are practically identical and are reversed, the construction and arrangement being such that the outer ends of the upper arms of the levers have substantially equal displacements in opposite directions for equal displacements of the slide 120 in one direction. Accordingly, for any given displacement of the slide 120 to the left or to its projected position with relation to the carrier 92 from its neutral position shown in Fig. 5, a common axis 300 of the screws 176, 178, which are connected through the links 172, 174 to the yoke 168, will be raised or lowered substantially equal distances in opposite directions, depending upon which of the levers 180, 182 is operatively connected to the slide, from an approximately horizontal plane 302 which passes through the axes of the screws 162, 176 and 178 and the pin 298, and which, when the holder is in its neutral position, coincides with a horizontal median plane of the cutter 58.

It is desirable to insure against the operator swinging the work holder 84 into such a position that it contacts the cutter 58. Accordingly, the carrier 92 has a depending lug 304 (Figs. 1, 2 and 9) which when swung in opposite directions with the jack 48 engages stops 306, respectively, of the arm 86 thereby limiting angular swinging movements of the jack 48 upon said arm.

Considerable effort is required by the operator to force the patterns 54, 82 against the rub collar 56 and to hold them pressed with the required force against said collar as the jack 48 is swung about the axes 50, 52 during the traversing of the wedge heel blank 30 past the cutter 58. In order to relieve the operator of the burden of manually forcing the patterns 54, 82 against the rub collar 56, the swinging arm 86 upon which the rod 90 of the jack is rotatably mounted is forced toward the cutter 58 by a fluid-pressure motor 308 (Figs. 1, 2, 8 and 9). The motor 308 comprises a piston 310 which is pivotally connected to the arm 86 and slides in a cylinder 312 mounted upon and secured to a base 314 (Figs. 1 and 8) swiveled upon a pin 316 screwed to the upper end of a post 318. Fluid is supplied to the motor 308 from a housing 320, entry of fluid to the cylinder 312 being controlled by a valve 322 which is opened in response to depression of a treadle 324 (Figs. 8 and 9) and is normally held closed by a spring 326.

Before operating upon a "run" of blanks 30 to produce wedge heel blocks 32 of a predetermined size and style the proper patterns 54, 82 are incorporated in the machine anad a sample blank 30 is so positioned in the holder 84 that when said holder is in its neutral position shown in Fig. 5 and identical portions of the rub faces of the patterns 54, 82 have been forced under operating pressure against the rub collar 56, opposite portions of the lateral edges 282 (Figs. 3, 4 and 14) of the upper face 284 of the blank 30 are arranged approximately equal distances from the axis of rotation of the cutter 58.

The operator then removes the sample blank 30 from the machine and after positioning and clamping the blank to be operated upon in the holder 84 depresses the treadle 324 to cause the fluid pressure motor 308 to swing the jack into such a position that identical portions of the patterns just forward of the "lead on" portions 290 (Figs. 10 and 11) of the rub faces of the patterns are in engagement with the rub collar 56 and are in alinement. When the jack 48 is thus positioned the holder is in its neutral position shown in Fig. 5, the upper face 284 of the wedge heel blank 30 bridging the common path of movement 328 or the loci of the edges 66 of the cutter 58 and the cutting edges "breaking out" of said face 284 of the blank approximately at the lateral edges 282 of the cup portion of said face of the blank.

The wood heel blank 30 is so positioned upon the holder 84 that when said holder is in its neutral position (Fig. 5) the opposite portions of the edges 282 of its heel seat are located equal distances from the axis of rotation of the cutter 58. Widthwise adjustment of heel blanks 30 of different widths is effected by positioning interchangeably rest plates 218 of the proper thickness in the machine, the construction and arrangement of the holder 84 being such that the backing board 230 and the angular rest 222 override the plate used in centralizing blanks of minimum width in the machine.

The position of the mount 202 lengthwise of the groove 198 of the yoke 168 is readily changed by loosening the cap bolts 208 and sliding the mount in either of two directions 212 (Figs. 3 and 5) to its proper position on the yoke, the cap bolt thereafter being tightened to maintain such adjustment. The angular position of the rest 222 and accordingly the backing board 230 about the pin 204 of the mount 202 can be readily varied by releasing the cap bolt 236 and the nut 240 and then swinging the backing board, which is adjustably fixed to the angular rest 222, to the desired position in which opposite portions of the edges 282 of the face 284 of the blank 30 are equidistant of the axis of rotation 63 of the cutter 58. The selection of a plate 218 of the proper thickness and the initial adjustment of the mount 202 upon the yoke 168 as well as the angular position of the backing board 230 upon the angular rest 222 are such that the opposite lateral edges 282 of the upper face 284 of the blank 30 lie approximately in the paths 328 of movement of the cutting edges 66 of the cutter 58 when the holder 84 is in its neutral position and is operating upon the cup portion of the heel blank, irrespective of the width, height or the wedge angle of the blank.

When the heel blank 30 in its neutral position has been presented to the cutter, as above described, the operator swings the jack clockwise as viewed from above so as to cause identical "lead on" portions 290 of the patterns 54, 82 to engage the rub collar 58 thereby forming the rear end portion of the attaching face 38 of the block 32 as the wedge heel blank traverses the cutter, the jack then being swung in a reverse direction, that is, counterclockwise, until the "lead off" portions 292 of the patterns have been moved onto the rub collar. The operator then removes his foot from the treadle 324 and the jack is swung away from the cutter 328 preparatory to removing the block 32 from the machine.

With the foregoing in view, it will be clear that so long as alined elements of identical portions of the cylindrical rub collar engaging faces of the patterns 54, 82, that is, the portions of the faces included between the leading ends of the patterns and break lines 330, 330a of said faces of the patterns, simultaneously engage the rub collar 56, the work holder 84 will be maintained in its neutral position shown in Fig. 5. As the patterns 54, 82 forced against the rub collar 56 are swung counter-clockwise, as viewed from above, from said break lines 330, 330a, the pattern 82 by reason of the action of the springs 152 slides rearward relatively to the pattern 54, causing the holder 84 to swing away from the cutter 58 approximately about one of the lateral edges 282 of the face 284 of the blank 30, depending upon whether a right or a left heel is to be formed from the blank.

As above explained, the rub collar engaging face of the pattern 54 has a lengthwise contour practically identical with that of the contour of the lengthwise median line 110 of the upper face 34 of wedge heel block 32 and, accordingly, the wedge heel 36. It will be appreciated that upon tilting the wedge heel blank 30 as above described, the line 110 will shift laterally slightly from the exact center of the block as it extends along the lower edge of said face but any difference produced from said shifting is so slight that it may be disregarded.

The patterns 54, 82 are produced and are usually handled in pairs and an operator after a short experience is able to superimpose one pattern upon its associated pattern and readily estimate by eye the shapes of the patterns necessary to produce in the above machine wedge heels of a desired shape.

It will be understood that plate portions of the yoke 168 in which the cam slots 296 are formed may be removed and other plate portions having cam slots centered about different axes substituted therefor.

Having described the invention, what we claim as new and desire to secure by Letters Patent of the United States is:

1. In a machine for use in the manufacture of wedge heels, a rotary cutter, an abutment, a carrier, a holder which is tiltingly mounted upon the carrier, means for positioning and clamping a wedge heel blank in the holder, said carrier having secured to it a guide pattern and being movable in a predetermined path controlled by the traversing engagment of said pattern with said abutment to cause the wedge heel blank in said holder to traverse the cutter, and means comprising an actuating pattern which is movable upon the carrier and is operatively connected to the holder, said means being adapted to maintain the holder in a neutral position upon the carrier during a portion of the traversing movement of the blank past the cutter and also being adapted to tilt the holder upon the carrier away from said neutral position during another portion of the said traversing movement of the blank past the cutter.

2. In a machine for use in the manufacture of wedge heels, a cutter rotatable about a fixed axis, an abutment, a carrier movable simultaneously about a pair of spaced parallel axes which are parallel to the axis of rotation of the cutter, a holder tiltingly mounted upon the carrier about an axis, means for maintaining the holder in a neutral position upon the carrier and for tilting about the last-named axis said holder upon the carrier away from said neutral position, and means for positioning in the holder a wedge heel block with one of the lateral edges of its upper face lying substantially in the axis about which the holder is tilted on the carrier.

3. In a machine for use in the manufacture of wedge heels, a cutter rotatable about a fixed axis, an abutment, a carrier movable simultaneously about a pair of spaced parallel axes which are parallel to the axis of rotation of the cutter, a holder tiltingly mounted upon the carrier for movement selectively about either of a pair of axes, means for maintaining the holder in a neutral position upon the carrier and for tilting said holder in opposite directions upon the carrier away from said neutral position about said last-named pair of axes, respectively, and means for positioning in the holder a wedge heel blank with the opposite lateral edges of its upper face lying substantially in said last-named pair of axes, respectively.

4. In a machine for use in the manufacture of wedge heels, a cutter movable about a fixed axis, an abutment, a carrier movable simultaneously about a pair of spaced axes which are parallel to the axis of rotation of the cutter, a guide pattern fixed to the carrier, an actuating pattern mounted on and movable with relation to the carrier, a holder tiltingly mounted upon the carrier, mechanism comprising said actuating pattern adapted to maintain the holder in a neutral position upon the carrier during a portion of movement of the carrier in a translatory path determined by the traversing engagement of the guide pattern with the abutment and also adapted to swing about an axis the holder upon the carrier away from said neutral position to a position determined by the position of the actuating pattern upon the carrier, and means for positioning and clamping a wedge heel block upon the holder with one of the lateral edges of its upper face lying substantially in the axis about which the holder is swung upon the carrier.

5. In a machine for use in the manufacture of wedge heels, a cutter rotatable about a fixed axis, a rub collar, a carrier movable simultaneously about spaced parallel axes which are parallel to the axis of rotation of the cutter, a guide pattern fixed to the carrier, an actuating pattern which is mounted for sliding movement upon the carrier, a holder tiltingly mounted upon the carrier selectively in opposite directions about two axes respectively, mechanism comprising said actuating pattern adapted when the actuating pattern is in an alined position on the carrier with the guide pattern to maintain the holder in a neutral position upon the carrier during a portion of movement of the carrier in a translatory path determined by the traversing engagement of said guide pattern with the rub collar, said mechanism also being adapted to swing about said last-named two axes the holder upon the carrier equal distances in opposite directions, respectively, from said neutral position in accordance with the displacement of the actuating pattern upon the carrier in one direction away from its alined position, and means for positioning and clamping a wedge heel blank upon the holder with the lateral edges of the upper face of the blank lying substantially in the respective axes about which the holder is swung upon the carrier.

6. In a machine for use in the manufacture of wedge heels, a cutter rotatable about a fixed axis, an abutment, a carrier mounted for simultaneous pivotal movement about spaced parallel axes which are parallel to the axis of rotation of the cutter, a pattern fixed to the carrier, a holder mounted upon the carrier, means for positioning and clamping a wedge heel blank in the holder, a second pattern which is slidingly mounted upon the carrier and is operatively connected to the holder, said patterns being pressed simultaneously against and traversing the abutment and serving to guide the carrier and accordingly a heel blank in said holder in a predetermined path past the cutter, and means responsive to movement upon said carrier of the second-named pattern relatively to the first-named pattern as said patterns traverse the abutment for tilting the holder upon the carrier approximately about one of the marginal upper edges of the wedge heel blank in the holder.

7. In a machine for use in the manufacture of wedge heels, a rotary cutter, an abutment, a carrier, a pattern fixed to the carrier, a second pattern mounted upon and movable with relation to the carrier, a holder which is mounted upon and is tiltable about an axis with relation to the carrier, means for positioning and clamping a wedge heel blank in the holder, said cutter and abutment on the one hand and said carrier, holder and patterns on the other hand being mounted for relative movement to effect, between the cutter and said blank in the holder, relative translatory movement controlled by the relative rubbing between the abutment on the one hand and the pattern which is fixed to the carrier on the other hand, means for effecting movement of the second pattern upon the carrier, and mechanism operatively connecting said second pattern and the holder for tilting, during said relative translatory movement between said cutter and said blank, the holder upon the carrier about said last-named axis.

8. In a machine for use in the manufacture of wedge heels, a rotary cutter, an abutment, a carrier, a pattern fixed to the carrier, a second pattern mounted upon but movable with relation to the carrier, a holder which is mounted upon and is tiltable selectively with relation to the carrier about spaced axes respectively, means for positioning and clamping a wedge heel blank in the holder, said cutter and abutment on the one hand and said carrier, holder and patterns on the other hand being mounted for relative movement to effect, between the cutter and said blank in the holder, relative translatory movement controlled by the relative rubbing between the abutment on the one hand and the pattern which is fixed to the carrier on the other hand, means for effecting movement of the second pattern upon the carrier, mechanism comprising a pair of levers which are pivotally mounted upon the carrier and are operatively connected to the holder, and means for selectively connecting said second pattern to either one of the levers for tilting, during said relative traversing movement between the cutter and said blank, the holder in opposite directions upon the carrier about said last-named axes in response to movement of said second pattern in one direction on the carrier.

9. In a machine for use in the manufacture of wedge heels, a cutter rotatable about a fixed axis, an abutment, a carrier mounted for simultaneous pivotal movement about spaced parallel axes which are parallel to the axis of rotation of the cutter, a guide pattern fixed to the carrier, a holder mounted upon and tiltable with relation to the carrier, an actuating pattern which is slidingly mounted upon the carrier and is operatively connected to the holder, said patterns being pressed against the abutment as the carrier is rotated about its axes to effect traversing engagement of the guide pattern along said abutment to move a heel blank in said holder in a predetermined path past the cutter, and means for moving the actuating pattern relatively to the guide pattern as the patterns traverse the abutment to tilt the holder and accordingly the heel blank widthwise upon the carrier during said traversing movement.

10. In a machine for use in the manufacture of wedge heels, a cutter mounted for rotation about a fixed axis, a rub collar positioned adjacent to the cutter, a carrier mounted for pivotal movement about a pair of spaced parallel axes which are parallel to the axis of rotation of the cutter, a holder mounted upon the carrier, means for positioning and clamping a wedge heel blank in the holder, a guide pattern which is fixed to the carrier, an actuating pattern which is mounted upon and is movable in the carrier, a pair of bell-crank levers which are mounted for pivotal movement upon the carrier and have arms movable in opposite directions in response to movement of the actuating pattern on the carrier in one direction, links for operatively connecting one of said arms selectively to the holder, a pin-and-slot connection through which the actuating slide is selectively connected operatively to one of the bell-crank levers, and cam-controlled connections between the carrier and the holder for constraining the holder for tilting movement substantially about one or the other of the lateral edges of an upper face of the blank positioned and clamped in the holder during movement of the actuating pattern in the carrier.

11. In a machine for use in the manufacture of wedge heels, a cutter mounted for rotation about a fixed axis, a rub collar positioned adjacent to the cutter, a carrier mounted for pivotal movement about two spaced axes which are parallel to the axis of rotation of the cutter, a holder mounted upon and selectively tiltable with relation to the carrier about either one of two axes, means for positioning a wood heel blank in and clamping it to the holder with the lateral edges of its upper face arranged generally in said last-named axes, a guide pattern which is fixed to the carrier, an actuating pattern which is mounted upon and is movable in the carrier, mechanism for operatively connecting the actuating pattern to the holder, said patterns having cylindrical faces portions of which are identical in outline and which when in alinement and simultaneously engaging the rub collar as the carrier is swung about its axes dispose the holder in a neutral position upon the carrier with the lateral edges of the upper face of the blank positioned equal distances from the axis of rotation of the cutter as the blank in the holder traverses the cutter in a path determined by the guide pattern, said mechanism comprising a pair of levers which may be selectively connected operatively to the actuating pattern and to the holder and which have arms respectively mounted for movement in opposite directions upon the carrier in response to movement of the actuating pattern in the same direction, and cam-controlled connections between the carrier and the holder for constraining the holder for tilting movement upon the carrier about said last-named axes as the holder is moved by said mechanism from its neutral position upon the carrier.

12. In a machine for use in the manufacture of wedge heels, a cutter rotatable about a fixed axis, an abutment, a carrier, a guide pattern fixed to the carrier, an actuating pattern mounted on and slidable in said carrier, said carrier being movable in a translatory path determined by the sliding engagement of the guide pattern with the abutment, a holder which is tiltingly mounted upon the carrier, means for positioning upon and clamping a heel blank in the holder, power means for forcing the patterns against the abutment, and mechanism which is responsive to movement of said actuating pattern upon the carrier and is operatively connected to the holder for tilting said holder upon the carrier as the heel blank in said carrier traverses the cutter.

13. In a machine for use in the manufacture of wedge heels, a cutter which is rotatable about a fixed axis, an abutment, a carrier mounted for simultaneous movement about spaced parallel axes which are parallel to the axis of rotation of the cutter, a holder mounted upon and tiltable with relation to the carrier, means for positioning and clamping a heel blank in the holder, a guide pattern fixed to the carrier, an actuating pattern which is movable in the carrier and is operatively connected to the holder, and power means for forcing the patterns against the abutment, said carrier being swung about said parallel axes as the patterns are forced against said abutment, thereby causing the heel blank on the holder to traverse the cutter and causing, during a portion of said movement, the holder to tilt on the carrier.

14. In a machine for use in the manufacture of wedge heels, a cutter rotatable about a fixed axis, a rub collar, a carrier mounted for simultaneous pivotal movement about axes which are parallel to each other and to the axis of rotation of the cutter, a pattern fixed to the carrier, a holder mounted upon and tiltable with relation to the carrier, a second pattern which is slidingly mounted upon the carrier and is operatively connected to the work holder, power means for forcing said patterns simultaneously against the rub collar as the carrier is swung about said axes to guide a heel blank in said holder in a predetermined path past the cutter, and mechanism operatively connecting the second-named pattern to the holder to effect in response to movement of the second-named pattern relatively to the first-named pattern tilting movement of the holder and accordingly the heel blank upon the carrier as the heel blank traverses the cutter.

15. In a machine for use in the manufacture of wedge heels, a cutter which is rotatable about a fixed axis, an abutment, a carrier swiveled for simultaneous movement about spaced parallel axes which are parallel to the axis of rotation of the cutter, a holder mounted upon and tiltable with relation to said carrier, means for positioning and clamping a heel blank in the holder, a guide pattern fixed to the carrier, an actuating pattern which is movable in the carrier and is operatively connected to the holder, a spring for forcing the actuating pattern to a projected position beyond the guide pattern, power means for forcing the patterns against the abutment, and manually actuated means for swinging the carrier and accordingly the heel blank about said spaced parallel axes while the guide patterns are forced against the abutment to cause the blank to traverse the cutter for removing the material from the upper face of said blank, said actuating pattern being moved to a projected position beyond the guide pattern by the action of the spring during a portion of the traversing movement of the blank past the cutter to tilt said blank into different angular positions upon the carrier as the blank traverses said cutter.

16. In a heel making machine, a cutter rotatable about a fixed axis, a fixed abutment, a carrier mounted for simultaneous movement about a pair of spaced parallel axes, a heel blank holder mounted upon the carrier and tiltable with relation to the carrier in opposite directions from a neutral position upon the carrier, a pair of patterns one of which is fixed to the carrier and the other of which is slidable on the carrier, said patterns being adapted to be forced against the abutment as said carrier is swung about said axis to guide a heel in said holder in a predetermined path past the cutter, and mechanism operatively connecting said other pattern to the holder to swing the holder into different positions upon the carrier in response to movement of said second pattern upon the carrier, said mechanism comprising a pair of connections which may be operatively secured selectively to the slidable pattern to swing the holder in opposite directions respectively from a neutral position on the carrier in response to movement of said other pattern in said one direction upon the carrier.

17. In a machine for use in the manufacture of wedge heels, a cutter rotatable about a fixed axis, a rub collar, a carrier, a pattern fixed to the carrier, a second pattern slidingly mounted upon the carrier, a holder which is mounted upon the carrier, means for positioning a heel blank upon and clamping it to the holder, said holder being tiltable approximately about one of the upper lateral edges of the heel blank positioned and clamped in it, mechanism for operatively connecting said second pattern to said holder, and a spring for constantly urging the second pattern to a projected position beyond the first-named pattern, said carrier being movable simultaneously about two spaced axes which are substantially parallel to the axis of rotation of the cutter in order to force in opposition to said spring the patterns against the rub collar and to swing them past said collar to cause the heel blank to traverse the cutter, said second pattern being adapted to control the angular relation of the heel blank on the holder as said blank traverses the cutter in accordance with the displacement of the second pattern from a neutral position upon the carrier.

18. In a machine for use in the manufacture of wedge heels, a cutter rotatable about a fixed axis, an abutment positioned adjacent to the cutter, a carrier, a holder for a heel blank, said holder being supported by and mounted for tilting movement upon the carrier, a pair of patterns one of which is fixed to the carrier and the other of which is movable on the carrier, mechanism for operatively connecting said other pattern to the holder, and a rub collar, said carrier being mounted for pivotal movement about spaced parallel axes to cause the heel blank in the holder guided by engagement of said one pattern with the rub collar to traverse the cutter, said patterns having collar-engaging faces portions of which are similar to each other, said other pattern through said mechanism being adapted to cause the holder to assume a neutral position in which an upper face of the heel blank is approximately parallel to the axis of rotation of the cutter when similar portions of the patterns respectively are in engagement with the rub collar, other portions of the collar-engaging faces of said patterns being dissimilar to cause, when their faces are in engagement with the rub collar, said other pattern to move relatively to said one pattern, thereby effecting tilting movement of the holder upon the carrier to cause the upper face of the blank upon the holder to be tilted at different angles to the axis of rotation of the cutter as said blank traverses the cutter.

19. In a machine for use in the manufacture of wedge heels, a cutter rotatable about a fixed axis, an abutment, a carrier movable about a pair of spaced parallel axes which are parallel to the axis of rotation of the cutter, a holder for a heel blank, said holder being tiltingly mounted upon the carrier for movement in opposite directions from a neutral position upon the carrier, a guide pattern fixed to the carrier, an actuating pattern mounted upon and movable with relation to the carrier, and mechanism for operatively connecting said actuating pattern to the holder, said patterns having cylindrical abutment engaging faces alined abutment engaging elements of which are parallel to the axes about which the carrier is moved, portions of said faces of the patterns being identical in longitudinal outline and having corresponding vertical elements in alinement to cause during traversing movement of the patterns past the abutment and the blank past the cutter said blank to maintain a neutral position in which opposite lateral edges of the upper face of said blank are positioned approximately equidistant from the axis of rotation of the cutter, other portions of said faces of the patterns being of different longitudinal outline to enable said actuating pattern during said traversing movement to slide relatively to the carrier and to the other pattern and in response to movement of said mechanism to tilt said holder to positions in which one of said lateral edges of the upper face of the blank being operated upon is swung substantially about the other lateral edge of the blank.

20. In a machine for use in the manufacture of wedge heels, a cutter rotatable about a fixed axis, a rub collar, a carrier rotatable about a pair of spaced parallel axes which are parallel to the axis of rotation of the cutter, a holder, means for positioning and clamping a wedge heel blank in the holder, said holder being mounted upon and tiltable in opposite directions from a neutral position upon the carrier about axes which extend generally along the lateral edges of the blank in the holder, a guide pattern fixed to the carrier, an actuating pattern mounted on and movable in the carrier, resilient means, and mechanism for operatively connecting the actuating pattern to the holder, said patterns having cylindrical collar-engaging faces elements of which are parallel to the axes about which the carrier is moved, portions of said faces of the patterns being identical in longitudinal outline to cause through said mechanism when said faces are forced against and traverse the rub collar the heel holder and accordingly the blank to assume upon the carrier neutral positions in which opposite lateral edges of the upper face of the heel blank are positioned approximately equidistant from the axis of rotation of the cutter, other portions of the faces of the patterns being of different longitudinal outlines to enable said actuating pattern acted upon by said resilient means during the traversing of the heel blank past the cutter to slide in the carrier and in response to movement of said mechanism selectively to tilt the holder with relation to the carrier about either one of said last-named axes.

HARLEY W. RUSS.
EDGAR E. JOINER, Jr.

No references cited.